(12) United States Patent
Roeder et al.

(10) Patent No.: US 9,311,234 B2
(45) Date of Patent: Apr. 12, 2016

(54) METHOD FOR RELIABLY ADDRESSING A LARGE FLASH MEMORY AND FLASH MEMORY

(71) Applicant: HYPERSTONE GMBH, Constance (DE)

(72) Inventors: Martin Roeder, Constance (DE); Thomas Seidel, Constance (DE)

(73) Assignee: Hyperstone GmbH, Constance (DE)

( * ) Notice: Subject to any disclaimer, the term of this patent is extended or adjusted under 35 U.S.C. 154(b) by 115 days.

(21) Appl. No.: 14/305,376

(22) Filed: Jun. 16, 2014

(65) Prior Publication Data
US 2015/0212935 A1 Jul. 30, 2015

(30) Foreign Application Priority Data
Jan. 24, 2014 (DE) .......... 10 2014 100 800

(51) Int. Cl.
*G06F 12/00* (2006.01)
*G06F 12/02* (2006.01)

(52) U.S. Cl.
CPC ........ *G06F 12/0246* (2013.01); *G06F 2212/65* (2013.01); *G06F 2212/7201* (2013.01)

(58) Field of Classification Search
None
See application file for complete search history.

(56) References Cited

U.S. PATENT DOCUMENTS

| 8,412,881 | B2 | 4/2013 | Boyle | |
|---|---|---|---|---|
| 2006/0271748 | A1* | 11/2006 | Jain | G11C 7/1021 711/154 |
| 2010/0287329 | A1* | 11/2010 | Toelkes | G06F 12/0246 711/103 |

* cited by examiner

*Primary Examiner* — Brian Peugh
(74) *Attorney, Agent, or Firm* — Laurence A. Greenberg; Werner H. Stemer; Ralph E. Locher

(57) ABSTRACT

A flash memory for a host system has a multiplicity of memory blocks. The memory blocks are subdivided into memory pages which can be written to and each memory page are also subdivided into partial pages and each partial page having a physical partial page address which is assigned a logical partial page address which can be addressed. The physical partial page addresses assigned to the logical partial page addresses are able to be determined using hierarchically organized structures of address tables for converting logical partial page addresses into physical partial page addresses. The multiplicity of memory blocks of the flash memory are divided into areas which comprise at least one static area of memory blocks which have been written to, a write area to which new and changed useful data are written, a block management area which stores management data for the memory blocks, and a logbook area.

11 Claims, 3 Drawing Sheets

US 9,311,234 B2

METHOD FOR RELIABLY ADDRESSING A LARGE FLASH MEMORY AND FLASH MEMORY

CROSS-REFERENCE TO RELATED APPLICATION

This application claims the priority, under 35 U.S.C. §119, of German patent application DE 10 2014 100 800.6, filed Jan. 24, 2014; the prior application is herewith incorporated by reference in its entirety.

BACKGROUND OF THE INVENTION

Field of the Invention

The invention relates to a flash memory for a host system, having a controller, a volatile cache memory and a multiplicity of memory blocks which can be erased in an erase process. The memory blocks are subdivided into memory pages which can be written to in a write process and each memory page having a physical page address which is assigned logical sector addresses which can be addressed by the host system. The physical page addresses assigned to the logical sector addresses are able to be determined using hierarchically organized structures of address tables for converting logical sector addresses into physical page addresses. The address tables have the size of a memory page. The invention further relates to a method for managing a multiplicity of memory pages in such a flash memory.

The development of flash memories has resulted in chips having ever larger storage capacities. The erasable memory blocks are also becoming larger and larger and, with them, the memory pages which can be written to as well.

In large memories, the so-called "write amplification factor" WAF is becoming an increasing problem. This denotes the ratio of the amount of data which must be physically written to the memory to the useful data which are intended to be written to the memory at a random position.

The WAF greatly depends on the type of address assignment between the logical addresses of the useful data used by the host system and the physical page addresses.

A frequently used method is based on the assignment of logical block addresses to the physical block addresses of the erasable memory blocks. This results in an entire physical block always having to be rewritten when a small data area is overwritten. However, only small management tables are required in this case.

If memory pages are intended to be directly addressable, large volatile memories (DRAM) are typically used for the address assignment tables and must be protected against a voltage failure by a battery or a large capacitor.

Another method for finely resolved address assignment is described in the Technical Report CSE-08-012, August 2008, from Pennsylvania State University, by Gupta et al. entitled "DFTL: A Flash Translation Layer Employing Demand-based Selective Caching of Page-level Address Mappings". The method shown there stores the address assignment tables in the flash memory itself and uses a small cache memory for a management table. The method described here has a few disadvantages, in particular there is no robustness against sudden voltage failures. Furthermore, the addressing method described here is not sufficient for very large flash memories. In addition, there are no features which make it possible to effectively manage the flash memory with respect to wear classes and to reuse memory blocks which have been used.

The patent specification U.S. Pat. No. 8,412,881 B2 describes a method for using tree structures for addressing flash memories. In this method, the tables are also held in the flash memory and only a relatively small cache memory is required. However, no precautions against a voltage failure are taken in the method. There are also no further features for managing the memory blocks.

Both of the methods cited above have the disadvantage that the atomic physical addressing unit is a physical memory page of the flash memory.

SUMMARY OF THE INVENTION

The object of the invention is to propose a structure of a large flash memory and a method for managing the multiplicity of partial memory pages of the large flash memory, in which there is no need for a large volatile memory and which allow the memory blocks to be effectively managed.

The flash memory is provided as a storage medium for a host system. It has a controller, a volatile memory which also contains a cache memory, and a multiplicity of memory blocks which can be erased in an erase process. The memory blocks are subdivided into memory pages which can be written to in a write process and each memory page has a physical page address which can be assigned logical sector addresses which can be addressed by the host system. The physical page addresses assigned to the logical sector addresses can be determined using hierarchically organized structures of address tables for converting logical sector addresses into physical page addresses. The address tables have the size of a memory page.

However, the size of the assignment unit is not restricted to a memory page and may also consist of an integer fraction of the size of a physical page.

In practice, this provides considerable advantages when writing to sector groups (so-called "clusters") if these clusters are smaller than a physical memory page since otherwise adjacent sectors which are not changed in a write instruction but are on the same page which is just changed by the host system would have to be mixed with the page to be written to. This is relevant, in particular, because modern flash chips with memory page sizes of 16 kB have already been implemented, but the cluster size which is used by many host systems for writing is very often only 4 kB. If memory pages are referred to below, integer fractions of memory pages which are referred to as partial memory pages are always also possible. Two variants can be used when writing to partial memory pages. On the one hand, each individual partial memory page can be directly written to an entire memory page or partial memory pages can be collected until a physical memory page is full. The variant can be selected depending on the situation.

The flash memory is distinguished by the fact that the multiplicity of memory blocks of the flash memory is divided into areas which contain at least one static area of memory blocks which have been written to, a write area to which new and changed useful data are written, a block management area which stores management data for the memory blocks, and a logbook area. Furthermore, the physical partial page addresses of the write area can be determined from the logical sector addresses using a useful data address table structure, and the physical page addresses of the block management area can be determined using a block management address table structure. The memory pages of the logbook area are intended to record changes to the address tables.

This structure of the flash memory makes it possible to hold the address tables in the flash memory itself and to buffer only a current branch of the address tables in the volatile memory for fast access. Address assignments can be reconstructed after a voltage failure using the logbook and the overhead area of the memory pages in the current write area. The logbook contains the address assignments which have already been transferred to the nonvolatile memory. The address cache memory in the RAM can be reconstructed from the logical sector addresses of the memory pages still in the write area. Therefore, there is no need for an energy store, such as a battery or a large capacitor, to maintain the volatile memory.

In one advantageous refinement of the invention, a commit area is additionally partitioned off from the multiplicity of memory blocks, which commit area contains at least pointers to the useful data address table structure, to the block management address table structure, to the start of the write area, to the start of the logbook, to the start of the block management area and to the current end of the block management area.

In another refinement of the invention, the memory blocks of the flash memory are also subdivided into interleave units, the memory blocks of which can be written to virtually simultaneously. The interleave units may be formed by separate flash chips or flash channels. The interleave units make it possible to operate the flash memory system in a particularly effective manner since a plurality of flash access operations can run in an overlapping manner.

The method for managing a multiplicity of memory pages in the flash memory of a host system, in the event of a write instruction from the host system for useful data at a logical sector address, provides for a new free partial memory page in a memory block of the write area to be searched for. The useful data address table structure is updated with respect to the new assignment of the logical sector addresses to the physical partial page address, the management data relating to the memory block belonging to the physical partial page address to be updated, and for the new physical address for the logical page to be entered in the cache memory.

In this manner, only as many physical partial memory pages as are needed to store the useful data provided by the host system are written to. The "write amplification factor" WAF is determined only by the possibly required filling of the data to be written to the size of the physical memory page.

The WAF does not increase linearly with the size of the memory block, as is the case in a block-oriented method.

The method also provides for the properties of memory blocks to be managed in memory pages of the block management area and for these memory pages to be addressed using the block management address table structure which is constructed like the useful data address table structure.

The address assignment is completely contained in the contents of the flash memory. In the event of a sudden voltage failure, the management data can be easily reconstructed since only a few memory blocks of the write area need to be inspected.

The address table structures contain a lowermost level of memory pages which respectively stores a number Np of physical partial page addresses which fills a memory page, and levels above each contain a number of memory pages each storing as many page pointers to the memory pages of the level below as are held by a memory page. The uppermost level of the address table structures is respectively formed by an input memory page storing a number of pointers which corresponds to the number of memory pages in the next level.

In this case, pointers to the input memory pages of the address table structures are held in the commit area.

The physical partial page address for a logical sector address in an address table structure is determined by the following steps determining the value x of the logical sector address, recursively determining the physical partial page addresses in the next higher levels of the associated address table structure using the entry i, where i is determined using the relationships $i = x \bmod Np$ and $y = \lfloor x/Np \rfloor$.

The management data relating to the memory blocks are advantageously stored in block counters for each memory block. These block counters are constructed as tuples with a fixed width containing details of an erase counter, a read counter, a counter for valid memory pages and status flags. The block counters are the lowermost level (level 0) of the block management address table structure.

The entries in the higher levels >0 of the block management address table structure contain details of the physical partial page address where the pointers of the next lower level are stored, a minimum use class of obsolete memory blocks, a minimum use class of valid memory blocks, a number of maximum obsolete memory pages in all associated block counters.

The methods described here for managing a flash memory can also be used in interleave structures. A static area, a write area, a separate useful data address table structure, a separate block management address table structure and a separate logbook are provided for each interleave unit. Unhindered use of the interleave structures therefore becomes possible.

Other features which are considered as characteristic for the invention are set forth in the appended claims.

Although the invention is illustrated and described herein as embodied in a method for reliably addressing a large flash memory and a flash memory, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
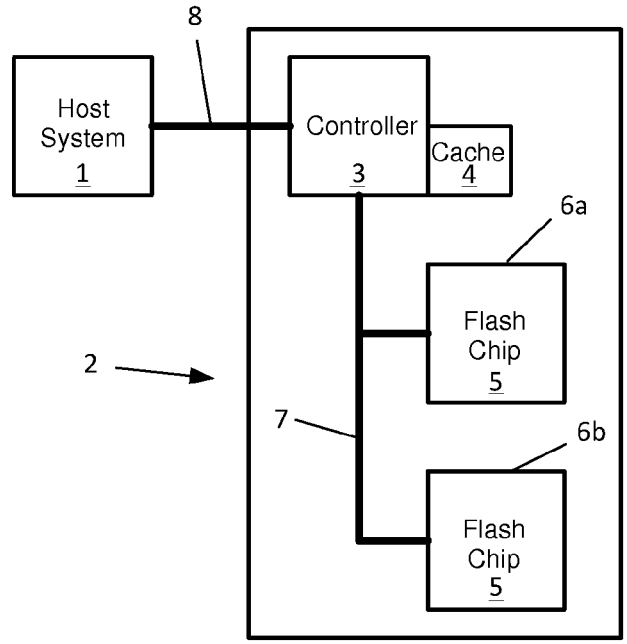
FIG. 1 is a block circuit diagram of an arrangement of a flash memory in a host system according to the invention.

Referring now to the figures of the drawings in detail and first, particularly to FIG. 1 thereof, there is shown a host system 1 which addresses a flash memory 2 via a host interface 8. The host interface 8 may be, for instance, a USB interface or a SATA interface. With the aid of a cache memory 4, a controller 3 manages the memory in flash chips 5, which may also be structured as interleave units 6a and 6b, via a memory bus 7.

Figure 2:
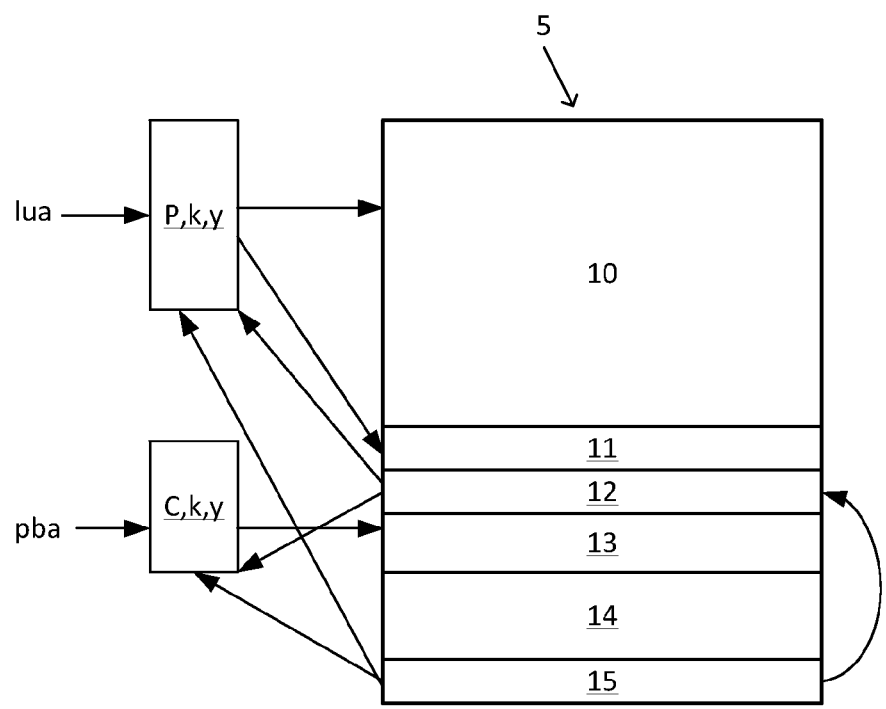
FIG. 2 is an illustration showing a division of the flash memory with access to address tables.

FIG. 2 shows division of the memory containing the flash chips 5 into a plurality of areas.

There is a static area 10 which contains memory blocks which have been written to and is intended only for read instructions.

New and changed useful data are written to a write area 11 but can also be read.

A logbook 12 contains sequential entries relating to the change of all management data.

A block management area 13 is filled with information for block management. In particular, it also contains the block management address table structure.

A free area 14 contains all blocks which are still free or whose memory pages have been completely marked as obsolete and therefore can be reused.

A commit area 15 contains the entries for the input pages of the useful data address table structure P,k,y and the block management address table structure C,k,y.

The entries for the input pages of the useful data address table structure P,k,y and the block management address table structure C,k,y are likewise transmitted to the logbook 12. The address table structures are constructed with the entries from one area or the other.

The commit area 15 also stores the pointers to the start of the other areas.

The useful data address table structure P,k,y converts the logical useful data address lua to the associated physical partial page address pua in the static area 10 or in the write area 11.

The block management address table structure C,k,y converts a physical block address pba to a block counter be in the block management area 13.

Figure 3:
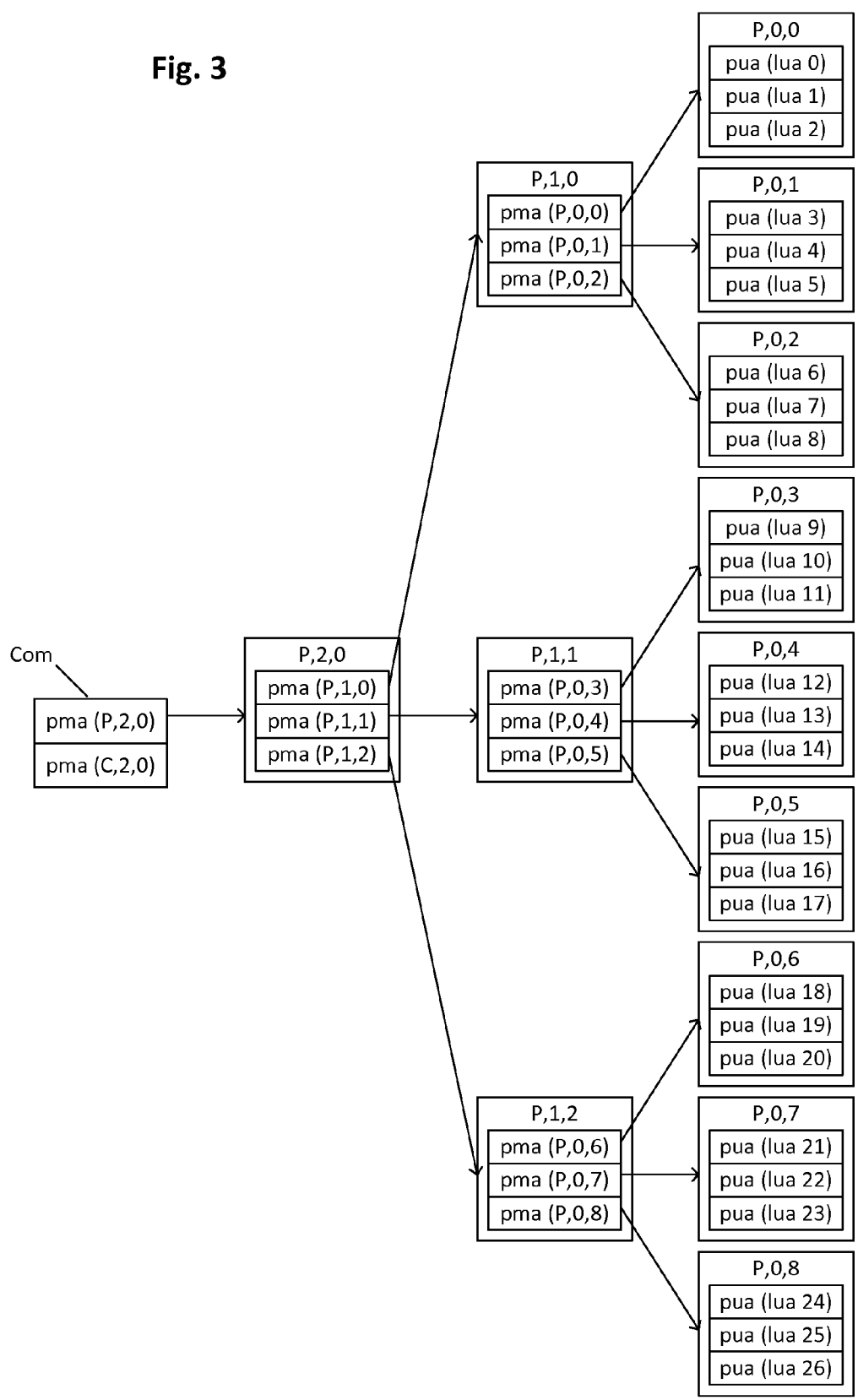
FIG. 3 is an illustration showing the useful data address table structure.

FIG. 3 illustrates a three-stage useful data address table structure P,k,y. An entry Com in the commit area points to the input page P,2,0 of the structure which contains entries with physical management addresses pma for the structural elements of the next level P,1,0 . . . 2.

The structural elements of the level P,1,0 . . . 2 contain entries with physical management addresses pma for the structural elements of the lowermost level P,0,0 . . . 8. The physical useful data addresses for the logical useful data addresses lua 0 . . . 26 are entered in the lowermost level P,0,0 . . . 8. The useful data address can therefore be determined by a simple pass through the address table structure.

The determination of a physical useful data address is intended to be explained using the now described example.

The flash memory may contain 1024 memory blocks each in turn containing 256 memory pages of 512 bytes. The memory therefore has a total of 262,144 memory pages.

An address entry is four bytes long. A memory page can therefore contain 128 address entries Np. 262,144/128=2048 memory pages are therefore needed in the lowermost level of the useful data address table structure P,0,y to store all address entries. 2048/128=16 memory pages are needed in the level P,1,y. The input level P,2,y contains one memory page with 16 entries.

In order to determine the current physical useful data page address pua for a logical useful data page address lua x=100,000, the input entry must be found in P,2,0. This is carried out most efficiently when the address table entries are determined from the bottom upward using integer division with a remainder. The address table entry at level P,0,$y_0$ is $y_0 = \lfloor x/Np \rfloor = 100{,}000/128 = 781$ remainder 32. 781 is the relative page number which must be found in the level above and 32 is the offset on page 781, where the physical address pua is stored. Next, the table entry for page 781 must be found in P,1,$y_1$. This is $y_1 = 781/128 = 6$ remainder 13, that is to say the entry at offset 13 on page 6 of level 1. Since level 2 consists only of one page, page 6 (of level 1) is already the offset of the address entry on the currently valid page of the uppermost level 2.

It is pointed out that, for such a calculation, only two divisions are required and can be carried out as simple shift operations. Since the input table is typically in the cache memory, only two read operations are also required in the flash memory. The determination can therefore be carried out very efficiently. In the general case with $k_{max}+1$ levels, $k_{max}$ divisions and $k_{max}$ read operations are required.

Figure 4:
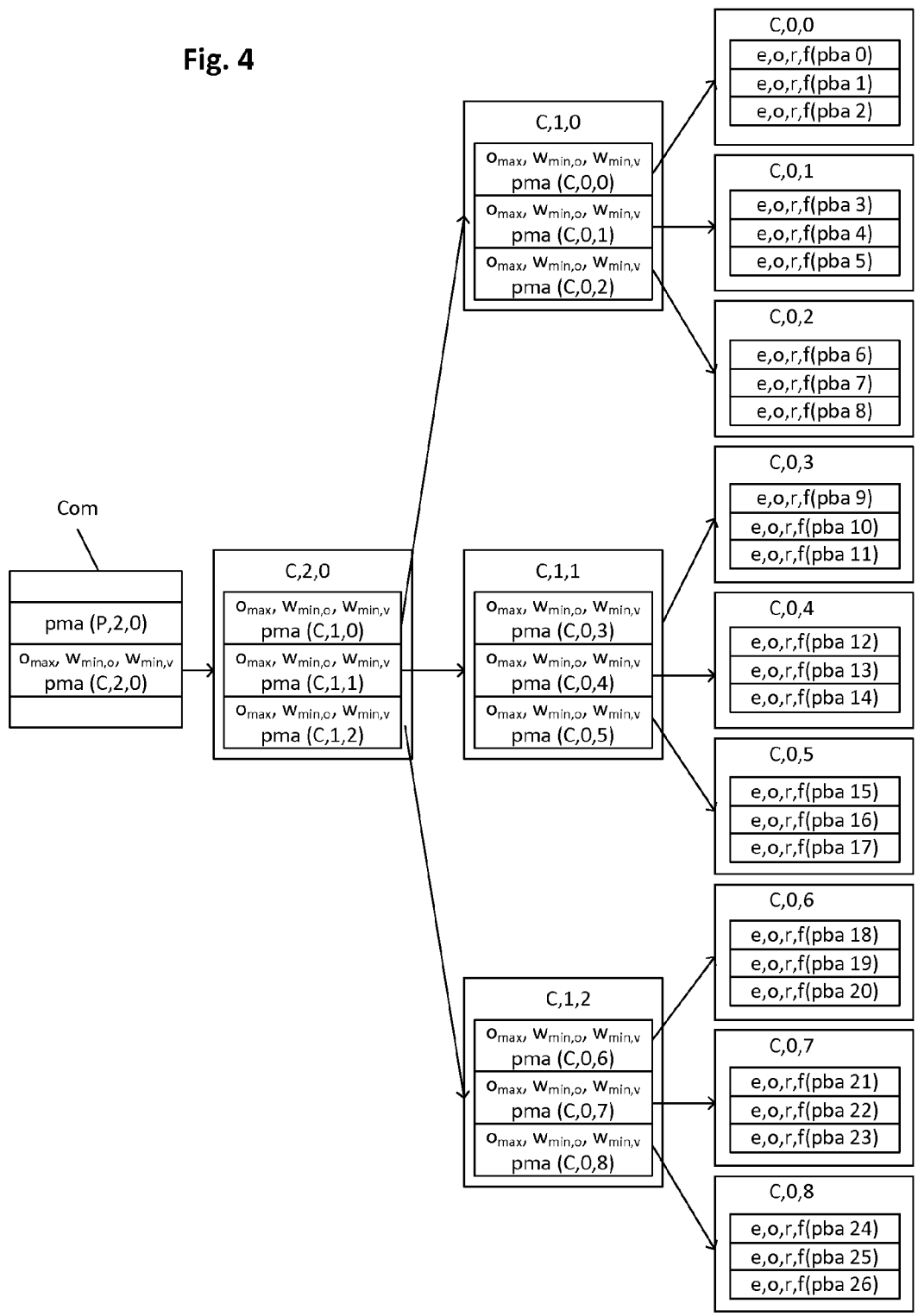
FIG. 4 is an illustration showing a block management address table structure.

FIG. 4 illustrates a three-stage block management address table structure C,k,y. An entry Com in the commit area points to the input page C,2,0 of the structure. The structure is constructed as described under the useful data address table structure P,k,y in FIG. 3. An entry in the lowermost levels C,0,y can likewise be determined.

The entries in the lowermost levels C,0,y contain information relating to the reading of the erase counter e, the number of obsolete memory pages o (validity counter), the reading of the read counter r and the status flags f of physical blocks.

The essential parameters of a memory block are thus determined in a very simple manner.

In addition to the pointers pma(C,k,y) to the entries in the next level, the entries in the levels C,2,0, C,1,y and also the Com entry also contain the validity counter $o_{max}$ for the memory block with the most obsolete partial memory pages, the minimum wear level class $w_{min,o}$ of the completely obsolete blocks and the minimum wear level class $w_{min,v}$ of the memory blocks with at least one valid partial memory page. The following is a summary list of reference numerals and the corresponding structure used in the above description of the invention:

REFERENCE SYMBOLS

1 Host system
2 Flash memory
3 Controller
4 Cache memory
5 Flash chips
6a, 6b Interleave units
7 Memory bus
8 Host interface
10 Static area
11 Write area
12 Logbook
13 Block management area
14 Free area
15 Commit area
C,k,y Block management address table structure
Com Entry in the commit area
Np Maximum number of entries in a (P,k,y) memory page
Nc Maximum number of entries in a (C,k,y) memory page
P,k,y Useful data address table structure
be Block counter
e Erase counter
f Status flags
i Entry in level 0
k Number of the level of the address table structure
lma Logical management address
lua Logical useful data address
o Validity counter
pba Physical block address
pma Physical management address
pua Physical useful data address
r Read counter
$w_{min,o}$ Minimum wear level class of the completely obsolete blocks
$w_{min,v}$ Minimum wear level class of the memory blocks having at least one valid partial memory page
x Value of the logical page address
y, $y_0$, $y_1$ Number of the memory page of a level

The invention claimed is:

1. A flash memory for a host system, comprising:
a controller;
a volatile cache memory connected to said controller; and
a multiplicity of memory blocks which can be erased in a respective erase process and connected to said controller, said memory blocks being subdivided into memory pages which can be written to in a respective write process and each memory page also being subdivided into partial pages and each partial page having a physical partial page address which can be assigned logical sector addresses which can be addressed by the host system, physical partial page addresses assigned to the logical sector addresses being able to be determined using hierarchically organized structures of address tables for converting the logical sector addresses into the physical partial page addresses, the address tables having a size of a partial memory page, said multiplicity of memory blocks divided into areas which contain at least one static area of memory blocks which have been written to, a write area to which new and changed useful data are written, a block management area which stores management data for said memory blocks, and a logbook area, and the physical partial page addresses of said static area and of said write area can be determined from the logical sector addresses using a useful data address table structure, the physical partial page addresses of said block management area can be determined using a block management address table structure, and changes to the address tables can be recorded in said volatile cache memory and in partial memory pages of said logbook area.

2. The flash memory according to claim 1, wherein said multiplicity of memory blocks have a commit area partitioned off, said commit area contains at least pointers to the useful data address table structure, to the block management address table structure, to a start of the write area, to a start of the logbook, to a start of the block management area and to a current end of the block management area.

3. The flash memory according to claim 1, wherein said memory blocks are subdivided into interleave units, said memory blocks of said interleave units can be used simultaneously.

4. A method for managing a multiplicity of memory pages in a flash memory of a host system, which comprises the steps of:
performing the following steps in an event of a write instruction from the host system for useful data at a logical sector address:
searching for a new free memory page in a memory block of a write area; and
updating a useful data address table structure with respect to a new assignment of the logical sector address to a physical partial page address, management data relating to memory blocks belonging to a physical partial page addresses are updated, and a changed address assignment is noted in a cache memory.

5. The method according to claim 4, which further comprises managing properties of the memory blocks in partial memory pages of a block management area and the partial memory pages are addressed using a block management address table structure which is constructed like a useful data address table structure.

6. The method according to claim 5, wherein address table structures contain a lowermost level of the partial memory pages which respectively stores a number Np of the physical partial page addresses or a number Nc of block counters which fills a partial memory page, and levels above each contain a number of partial memory pages each storing as many partial page pointers to the partial memory pages of the level below as are held by a partial memory page, and an uppermost level of the address table structures is respectively formed by an input partial memory page storing a number of pointers which corresponds to a number of the partial memory pages in a next level.

7. The method according to claim 6, wherein pointers to input partial memory pages of the address table structures are held in a commit area.

8. The method according to claim 6, wherein the physical partial page address for the logical sector address in the address table structure is determined by means of the following steps:
determining a value x of the logical sector address; and
recursively determining the physical partial page address in respective next higher levels of associated address table structure using an entry i with relationships $i = x \mod Np$ and $y = \lfloor x/Np \rfloor$.

9. The method according to claim 7, which further comprises:
storing the management data relating to the memory blocks in block counters for each memory block and the block counters are constructed as tuples with a fixed width containing details of an erase counter, a read counter, a validity counter for each memory block and status flags.

10. The method according to claim 5, wherein an entry in levels $k>0$ of the block management address table structure contains details of the physical partial page address of a partial page in a next lower level, a minimum use classes of obsolete and valid memory blocks and a maximum validity counter of all associated block counters.

11. The method according to claim 4, which further comprises providing a separate useful data address table structure, a separate block management address table structure, a separate logbook, a separate static area and a separate write area for each interleave unit.

* * * * *